Figure 1:
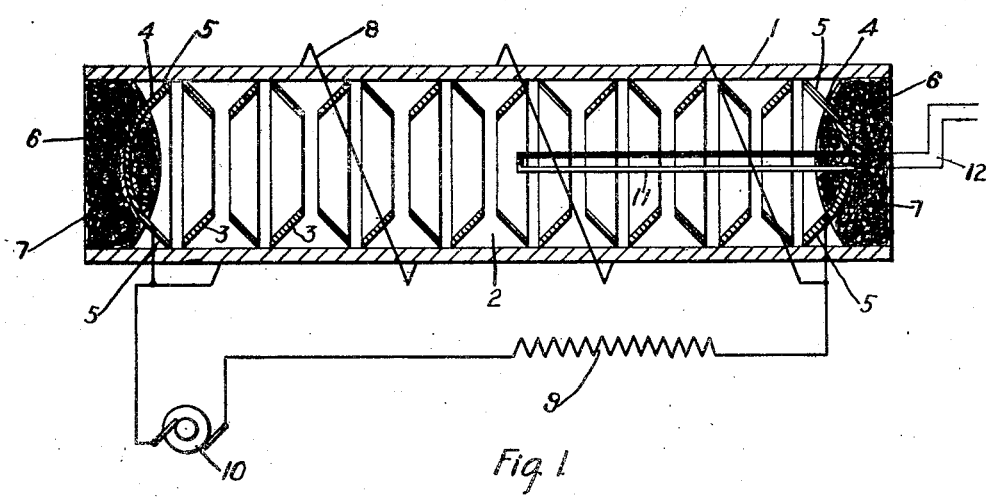

L. W. CHUBB AND J. SLEPIAN.
CONSTANT TEMPERATURE DEVICE.
APPLICATION FILED JULY 10, 1918.

1,367,122.   Patented Feb. 1, 1921.

WITNESSES:
H.B.Funk
J.M.Procter

INVENTOR
Lewis W. Chubb.
Joseph Slepian.
BY
Wesley G. Carr
ATTORNEY

UNITED STATES PATENT OFFICE.

LEWIS W. CHUBB, OF EDGEWOOD PARK, AND JOSEPH SLEPIAN, OF WILKINSBURG, PENNSYLVANIA, ASSIGNORS TO WESTINGHOUSE ELECTRIC AND MANUFACTURING COMPANY, A CORPORATION OF PENNSYLVANIA.

CONSTANT-TEMPERATURE DEVICE.

1,367,122.     Specification of Letters Patent.     Patented Feb. 1, 1921.

Application filed July 10, 1918. Serial No. 244,334.

*To all whom it may concern:*

Be it known that we, LEWIS W. CHUBB, a citizen of the United States, and a resident of Edgewood Park, in the county of Allegheny and State of Pennsylvania, and JOSEPH SLEPIAN, a citizen of the United States, and a resident of Wilkinsburg, in the county of Allegheny and State of Pennsylvania, have invented a new and useful Improvement in Constant-Temperature Devices, of which the following is a specification.

Our invention relates to constant-temperature devices and particularly to means for maintaining the temperature of a member constant.

One object of our invention is to provide means whereby a member may be disposed in a substance having a definite melting point and such characteristics that, irrespective of the heat applied thereto, in excess of a predetermined amount, the composition of the substance remains the same to cause the temperature of the member to be maintained at the melting point of the substance.

Another object of our invention is to provide means whereby the substance or mixture in a device of the above-indicated character shall be caused to melt over a closed surface to cause the temperature of the device to be uniform throughout.

A further object of our invention is to provide a device of the above-indicated character that shall be simple and inexpensive to construct and effective in its operation.

Copending application, Serial No. 244,333, filed on even date herewith by J. Slepian and assigned to the Westinghouse Electric & Manufacturing Company discloses a constant-temperature device that comprises a hydrated salt or other salt mixture having a definite melting point. If the junction of a thermo-couple is disposed in the mixture and the mixture is heated, by alternating current, the mixture will melt at a definite temperature and, since, when it melts, its composition does not change, the temperature to which a thermo-couple is subjected is maintained at the melting point of the mixture, irrespective of the heat applied thereto in excess of a predetermined amount.

In our present invention, we provide means whereby the melting of the substance or mixture will take place over its entire surface to form a closed melting surface and thus insure that the interior of the mixture shall be maintained at the temperature of the melting point. We also provide a novel structure for a constant-temperature device that renders the device practicable to construct and effective in its operation.

Figure 2:
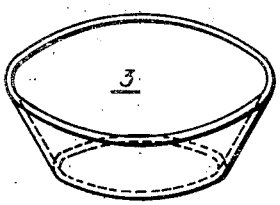

Figure 1 of the accompanying drawings is a diagrammatic view of a constant-temperature device embodying our invention, and Fig. 2 is a perspective view of one of the conducting members shown in Fig. 1 of the drawings.

The constant-temperature device comprises a cylindrical insulating member 1 in which is disposed a substance, such, for example, as a salt mixture 2 that is adapted to melt and become a conductor at a definite temperature. Hollow conducting members 3, of substantially frusto-conical shape, are separated from each other, placed back-to-back and disposed in the mixture 2. Conducting members 4 of substantially bell shape are disposed at each end of the cylindrical member 1, with the portions 5 thereof extending into the mixture 2 and the portions 6 thereof disposed in heat-insulating cap members 7. A heating winding 8 is disposed around the cylinder 1, and the terminals thereof are connected to the respective members 4 and, through an impedance device 9, to a source 10 of alternating current. A thermo-couple 11, or other member to be maintained at a constant temperature, is disposed axially in the mixture 2, and conductors 12 extend through one of the cap members 7 to the outer end of the device.

The substance 2 may be either a pure salt or a salt mixture having a definite melting point at which it becomes a conductor. That is, it must have such characteristics that, irrespective of the melting caused by heating, the composition of the mixture remains the same and thus the temperature of the device is maintained at the melting point of the same, irrespective of the heat applied thereto in excess of a predetermined amount.

Since the winding 8 and the circuit between the conducting members 4 are connected in parallel, when the mixture 2 melts the resistance of the circuit is reduced to cause the Joulian heat to be decreased in accordance with the melting. Melting of the mixture 2 stops when the Joulian heat has been reduced to that point at which it compensates for the radiation from the device. The conducting members 3 are so disposed that, when the mixture 2 is heated to a predetermined temperature, it will melt along the surface of the members 3 and across the junction between the same to thus cause the mixture 2 to melt over a closed surface extending from one end, along the top of the mixture, down the other end, and along the bottom of the mixture, to the first-mentioned end. Since there is substantially no heat generated in the interior of the mixture 2, the temperature throughout the closed surface will be substantially that of the surface and, since the surface of the molten material is in contact with solid material, the temperature throughout the device will be that of the melting point of the mixture. Thus, when sufficient alternating current is supplied to the device, hysteresis and eddy current losses in the conducting members 3 cause the mixture 2 to melt throughout its surface, and the temperature to which the thermo-couple 11 is subjected will be maintained constant, irrespective of the melting of the mixture 2 caused by the heating because the mixture 2 is such that its composition remains constant and, since materials having such composition have a definite melting point, the temperature to which the thermo-couple 11 is subjected is, at all times, the temperature of the melting point of the mixture 2, irrespective of the change in heating current or the ambient temperature.

The substance 2 may be a pure salt, such as lead iodid that has a melting point of 61° C. and becomes a conductor at this temperature. A second class of substance that may be used is that of a eutectic mixture, such as bismuth chlorid and ferric chlorid, in which the latter salt occurs in the proportion of substantially 23% by weight. Such a mixture is a fluid at a temperature above 171.5° C. at which point both the bismuth chlorid and the ferric chlorid precipitate out as heat is removed but maintain the proportion of 23% ferric chlorid, and thus the composition of the remaining fluid mixture does not change when heat is withdrawn. A third class of substances suitable for this purpose are hydrated salts having an indifferent point on their temperature solubility curves. An example of this class is a solution of zinc sulfate which is saturated at 50° C. If heat is removed from this solution at 50° C., the zinc salt precipitates out but it crystallizes with seven molecules of water to cause the solid salt to have the same composition as the original solution, and the temperature remains at 50° C. until the whole solution has been converted into a solid zinc sulfate with seven molecules of water of crystallization.

A fourth class of substances that may be used is a eutectic mixture of a solid crystallizing with two different proportions of water in a water solution. An example of this type is a solution of ferric chlorid in water having the proportion of seventeen gram molecules of the ferric chlorid to 100 gram molecules of water. Such a mixture is a fluid at a temperature above 35° C., and when it is cooled to a temperature of 35° C. and heat further removed a solid precipitate forms comprising ferric chlorid ($7H_2O$) and ferric chlorid ($5H_2O$) in such proportions as to give the same total composition as the original solution. As this mixture precipitates out, the composition of the remaining solution remains unchanged and the temperature remains at 35° C. until the mixture has turned into a solid of the two hydrated iron salts.

Our invention is not limited to the specific structure illustrated as it may be variously modified without departing from the spirit and scope of the invention as set forth in the appended claims.

We claim as our invention:

1. A constant-temperature device comprising a substance having a definite melting point, means for heating the substance and means disposed therein for causing the substance to melt over a closed surface.

2. A constant-temperature device comprising a salt body having a definite melting point, means for heating the body and conducting means disposed in the body to cause the same to melt over a closed surface.

3. A constant-temperature device comprising a salt mixture having a definite melting point, means for heating the mixture and annular conducting means disposed in the mixture to cause the same to melt over a closed surface.

4. A constant-temperature device comprising a salt mixture having a definite melting point, electric means for heating the same, and means connected in shunt relation to the heating means for so causing the entire outer surface of the mixture to melt that the interior of the mixture shall be maintained at a constant temperature, irrespective of the heat applied thereto.

5. A constant-temperature device comprising a salt mixture having a definite melting point, a heating winding disposed around the mixture, a plurality of separated conducting members disposed in the mixture and means for connecting the outer-conducting members to the respective terminals of the heating winding.

6. A constant-temperature device comprising a cylindrical member of salt having an indifferent point on its temperature solubility curve, a plurality of annular conducting members embedded in the cylindrical member, a heating winding, a means for so connecting the conducting members to the heating winding that, when the salt melts, a path is connected in parallel with the winding to maintain means that is disposed in the cylindrical member at the constant temperature of the indifferent point.

7. A constant-temperature device comprising a cylindrical member of salt having an indifferent point on its temperature solubility curve, a plurality of annular conducting members of frusto-conical shape embedded back-to-back in the cylindrical member and means for heating the cylindrical member.

8. A constant-temperature device comprising a cylindrical insulating member, a hydrated salt mixture therein, conducting members of substantially hollow frusto-conical shape disposed in the mixture, conducting members of bell-shape at each end of the cylindrical member and a winding disposed around the cylindrical member and connected at its respective terminals to the members of bell-shape.

9. A constant-temperature device comprising a substance having a definite melting point, means disposed therein for causing the substance to melt over a predetermined surface and means for electromagnetically heating said melting means.

In testimony whereof we have hereunto subscribed our names this 29th day of June, 1918.

LEWIS W. CHUBB.
JOSEPH SLEPIAN.